United States Patent Office 3,586,603
Patented June 22, 1971

3,586,603
NUCLEAR FUEL ROD HAVING AN OFFSET PLENUM
Douglas P. Hines, Saratoga, Calif., assignor to the United States of America as represented by the United States Atomic Energy Commission
Filed Oct. 10, 1968, Ser. No. 766,431
Int. Cl. G21c *3/04, 3/21*
U.S. Cl. 176—68          5 Claims

ABSTRACT OF THE DISCLOSURE

A plenum design for non-vented or vented nuclear fuel which allows for a reduction in the core coolant pumping requirements from the conventional plenum configuration of fuel pins or rods. This is accomplished by offsetting the plenum region of the fuel pin and grouping several of the plena such that they nest together. The flow regions left between the small bundles of plena offer less resistance to flow and thus reduce the core pressure drop. The plenum configuration can be utilized in sodium-cooled, steam-cooled and gas-cooled reactors.

BACKGROUND OF THE INVENTION

The invention described herein was made in the course of, or under, AEC Contract No. AT(04–3)–189, Project Agreement No. 10, with the United States Atomic Energy Commission.

This invention relates to nuclear reactors, particularly to fuel pins or rods for nuclear reactors, and more particularly to a fuel pin or rod configuration, the use of which provides a reduction in the reactor core coolant pumping requirements.

As well known, fast reactor fuel is characterized by an economic requirement for long burnup and high specific power. Under these conditions, many fuels including oxides, carbides and nitrides release large quantities of fission gas. One design of the fuel permits the fission gas to escape continuously from the fuel pin or rod to reduce the pressure differential across the fuel clad. Another design class, referred to as non-vented fuel, contains the gas within the fuel pin or rod predominatly in a region apart from the fuel called the plenum.

Previous non-vented and vented fuel rod or pin configurations have arranged the fuel and plenum in a metallic sheath, best described as a right cylinder with no offset. Thus the hydraulic diameter presented thereby has been invariant with length. One economic penalty of this prior non-vented fuel pin configuration or vented pins wherein the vent is relatively long is associated with the high collant pressure drop as it traverses the region of the plena of the fuel rods.

SUMMARY OF THE INVENTION

The present invention is based upon the finding that the coolant pressure drop can be reduced by taking advantage of the fact that the plenum region of the reactor does not have to have the same hydraulic diameter that exists in the core region. The general form of the pressure drop equation often referred to as the Darcy equation is:

$$\Delta_\rho = \zeta f \frac{L}{D} \frac{V^2}{2g}$$

wherein:
$\Delta_\rho$ = pressure drop
$\zeta$ = fluid specific gravity
$f$ = friction $f$
$L$ = length
$D$ = hydraulic diameter
$V$ = fluid velocity
$g$ = gravitational constant It is thus seen that the total pressure drop over the plenum region can be reduced by increasing the hydraulic diameter. This has been accomplished by this invention in utilizing a nonvented fuel pin or rod configuration wherein the plenum region of the pin is offset with respect to the fuel region, and clustering or bundling the plena together so as to present an increased hydraulic diameter, whereby the result will be a reduction in the overall hydraulic diameter for coolant flow since most of the flow will now be directed between the clusters or bundles instead of between the plena of the various fuel pins.

Therefore, it is an object of the present invention to provide an improved nuclear fuel pin configuration.

A further object of the invention is to provide a fuel pin configuration which allows for a reduction in the reactor core coolant pumping requirements.

Another object of the invention is to provide a fuel pin configuration which lends to bundling the plenum regions thereof while allowing the fuel regions thereof to be sufficiently spaced to allow proper cooling.

Another object of the invention is to provide a cluster of fuel pins or rods which are constructed so as to provide an offset plenum region, whereby the clustered plenum regions function to reduce the hydraulic diameter for flow of coolant thereabout and thereby reduce the pumping requirements for the coolant.

Other objects of the invention will become readily apparent from the following description and accompanying drawings, wherein:

DESCRIPTION OF THE INVENTION

As pointed out above, this invention provides a vented or non-vented fuel pin configuration which substantially reduces the reactor core coolant pumping requirements, while providing sufficient area to contain either a lengthy vent configuration, or contain the fission gas produced by the fuel during burnup thereof in the case of a non-vented fuel pin.

Figure 1:
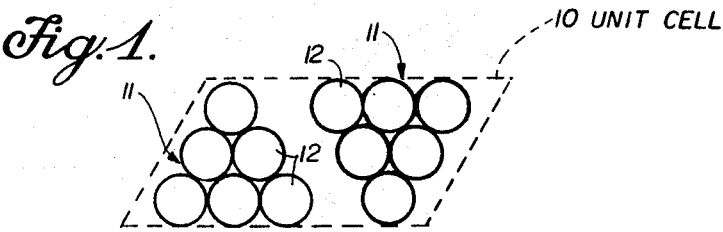
FIG. 1 is a plan view of a fuel unit cell illustrating two clusters or bundles of the inventive fuel rods or pins.

Referring now to FIG. 1, a fuel unit cell 10 of a nuclear reactor core is provided, for example, with two clusters or bundles, generally indicated at 11, of fuel pins or rods 12. In this specific embodiment, each of the clusters 11 consist of six fuel pins 12, the spacing between the plenum sections of the clusters or bundles 11 being between two and three times the pin-to-pin spacing utilized by the prior fuel configurations, this being accomplished due to the novel offset plenum configuration described hereinafter with respect to FIG. 2.

Figure 2:
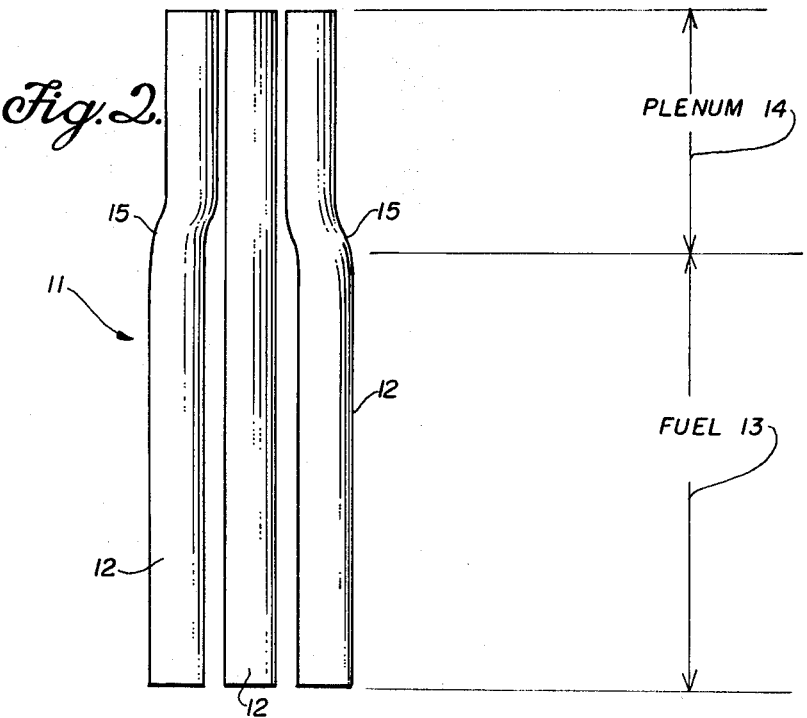
FIG. 2 is a side view of a portion of the FIG. 1 fuel unit cell and illustrating an embodiment of the novel rod configuration.

As illustrated in FIG. 2, the fuel pins 12 of a cluster 11 comprise a fissile fuel section 13 proximate the lower end and a fission product gas plenum section 14 proximate the upper end. Plenum sections 14 each include an offset portion at the lower end thereof as indicated at 15. The offset portion 15 is configured to place the plenum sections 14 of each fuel pin or rod 12 in contiguous array and place the fuel sections 13 in ordered spaced arrays due to the axis of the plenum section with respect to the axis of the fuel section. While only three of the six fuel pins 12 of the cluster 11 is illustrated in FIG. 2 for purposes of clarity, it is readily seen how the entire cluster would appear.

As pointed out above, the primary advantage of this invention is the reduction in total pressure drop of coolant through the fuel cluster due to the offset configuration of the plenum sections of the fuel rods which, when bundled together as in clusters 11, provides an increased hydraulic diameter. Since the cooling requirements at the fission gas plenum sections 14 are substantially less than at the fissile fuel sections 13, the plena (sections 14) can be bundled together to present an overall increased hydraulic diameter, while the fuel sections 13 are spaced for efficient cooling.

Also, as pointed out above, the spacing between the plenum sections of the clusters or bundles 11 due to the novel fuel pin configuration will be between two and three times the pin-to-pin spacing utilized in prior fuel pin clusters. Thus, most of the coolant flow in the plena area will be directed between the clusters 11, with the coolant moving at an unreduced velocity, but nevertheless within a greater hydraulic velocity than would be the case in the core region.

The length of the offset portions 15 of the plenum sections 14 will vary for different fuel cluster requirements. The offset 15 can be completed within a few inches of length of the fuel pin 12 without introducing significant stress or material strain problems.

The improvement to the hydraulic performance for a typical sodium-cooled reactor was calculated by comparing the performance of a standard fuel rod or pin design with that of the novel offset plenum design. The specific example of the inventive fuel rod 12 consisted of the following:

Core length—30 inches
Blanket length—15
Plenum length—48 inches
Pitch/diameter—1.25
Coolant velocity—30 ft./sec.

The standard fuel rod or pin use for the comparison was similar in construction except for not having the novel offset 15 (Pitch/diameter), it being a typical right cylinder rod.

Under these conditions, the core pressure drop for the standard design was calculated to be 138 p.s.i.; while for the present inventive design it was 89.7 p.s.i. This amounts to a reduction of pressure drop through the core of 35%. A rough calculation showed that this would amount to a savings in the fuel cycle cost of approximately 5%.

It has thus been seen that this invention provides a vented or a non-vented nuclear fuel pin or rod configuration which allows for a reduction in the reactor core coolant pumping requirements, thereby increasing the efficiency of the overall reactor operation, and is applicable to liquid-cooled or gas-cooled reactors of the non-vented fuel type.

While a particular embodiment of the invention has been illustrated and described, modifications and changes will become apparent to those skilled in the art, and it is intended to cover in the appended claims all such modifications and changes as come within the spirit and scope of the invention.

What is claimed is:

1. A nuclear fuel rod comprising a longitudinally extending fissile fuel section proximate the lower end thereof, and a longitudinally extending fission product gas plenum section proximate the upper end thereof, said plenum section including an offset portion at the end thereof adjoining said fuel section, wherein the longitudinal axis of the end portion of said plenum section opposite said offset portion is offset and substantially parallel with respect to the longitudinal axis of said fuel section.

2. The nuclear fuel rod defined in claim 1, combined with a plurality of fuel rods to form a cluster, wherein said cluster comprises said fuel rods with said offset portion of said plenum section each in contiguous array and said fuel sections in ordered spaced array, such that said plenum sections presenting an increased hydraulic diameter to coolant flowing thereabout, thereby causing a reduction in total pressure drop of coolant flowing through the fuel rod cluster without decreasing the cooling effect about said fuel sections of said rods.

3. The cluster of fuel rods defined in claim 2, wherein said cluster is composed of six of said fuel rods.

4. The cluster of fuel rods defined in claim 2, combined with at least one fuel rod cluster to form a fuel unit cell, said contiguous array of plenum sections of each of said clusters being spaced with respect to one another such that a major portion of coolant flow about said plenum sections will be directed between said contiguous arrays of plenum sections of said clusters, while flow between individual plenum sections is at a very slow velocity, thereby reducing the coolant pressure drop therethrough.

5. The nuclear fuel rod defined in claim 1, wherein said fissile fuel section, said plenum section, and said offset portion of said plenum section each define a generally circular cross-sectional configuration.

References Cited

UNITED STATES PATENTS

| | | | |
|---|---|---|---|
| 3,030,291 | 4/1962 | Butler et al. | 176—67 |
| 3,275,522 | 9/1966 | Kinsey et al. | 176—73 |
| 2,820,751 | 12/1952 | Saller | 176—67 |
| 3,454,468 | 7/1969 | Franco-Ferreria | 176—37X |

CARL D. QUARFORTH, Primary Examiner

G. G. SOLYST, Assistant Examiner

U.S. Cl. X.R.

176—78